Jan. 29, 1924. 1,482,190
F. C. HOHENSTEIN
LOCOMOTIVE TRUCK CURVE ADJUSTING MECHANISM
Filed March 29, 1923
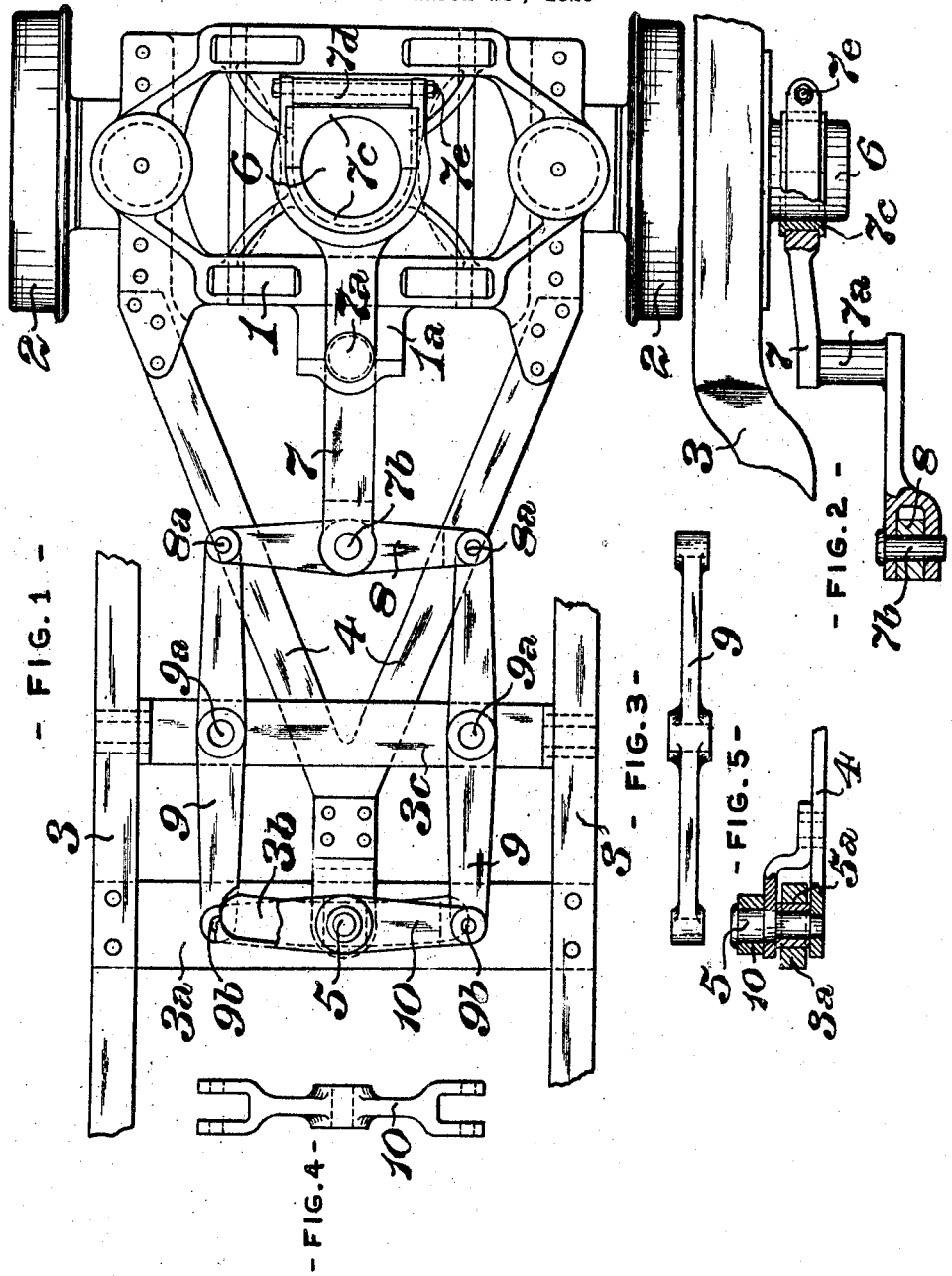
WITNESSES
INVENTOR Patented Jan. 29, 1924.

1,482,190

UNITED STATES PATENT OFFICE.

FREDERICK C. HOHENSTEIN, OF DUNKIRK, NEW YORK.

LOCOMOTIVE TRUCK-CURVE-ADJUSTING MECHANISM.

Application filed March 29, 1923. Serial No. 628,468.

*To all whom it may concern:*

Be it known that I, FREDERICK C. HOHENSTEIN, a citizen of the United States, and a resident of Dunkirk, in the county of Chautauqua and State of New York, have invented a certain new and useful Improvement in Locomotive Truck-Curve-Adjusting Mechanism, of which improvement the following is a specification.

The object of my invention is to provide improved means for making the leading or trailing truck of a locomotive engine to so adjust itself to the conditions of curved track, as to materially reduce wear of wheel flanges and rails, and adapt the locomotive to pass through curves of track at higher speed and with greater safety than has been found practicable with existing constructions.

The improvement claimed is hereinafter fully set forth:

In the accompanying drawings: Figure 1 is a plan or top view of a locomotive truck, illustrating an application of my invention; Fig. 2, a view, partly in side elevation and partly in section, of the adjusting lever; Fig. 3, a side view, in elvation, of one of the floating levers; Fig. 4, a similar view of the thrust lever; and, Fig. 5, a partial vertical section, on the axial line of the radius bar fulcrum pin.

It has been well recognized in railroad practice that locomotives for road service require the application of a leading truck, to guide them around curves and for the effective accomplishment of this function, it is manifestly essential that the truck should have the capacity of adjusting itself freely to the curvature of the track. In two wheel leading trucks of the usual construction, this is sought to be accomplished by the application of a radius bar, extending rearwardly from the truck frame, and connected to a cross tie on the main frame of the locomotive by a pivot pin, about which it is adapted to swivel. The length of the radius bar is calculated by an accepted formula, and the pivot pin is made of ample strength, as the reaction through said pin constitutes the larger factor in guiding the locomotive. The pressure of the truck wheel flange against the outer rail of the curve, tends to swing the truck inwardly, towards the centre of the curve, and on a radius governed by the location of the radius bar pin, thereby accomplishing the function of guiding the locomotive around the curve.

In passing through a curve, the friction between the flange of the outer truck wheel and the outer curved rail, results in considerable wear of both the wheel flange and the rail. In pushing the front of the locomotive around the curve, the face of the hub of the outer wheel bears against the adjacent face of the journal box, which results in wear between these faces, and the total amount of wear may reach an aggregate such that a truck entering a curve will bring up against the outer rail with considerable impact, sufficient, at times, to cause a breakage of wheel flange or rail, resulting in derailment. Inasmuch as the angle formed between the wheel flange and the outer curved rail is governed by the rigid position of the radius bar fulcrum pin, the wear would be materially reduced if the truck wheel flange is given its angularity with the track by the track itself, or conversely, that a certain degree of flexibility should be introduced at the fulcrum.

My invention is designed to accomplish this object, by the application of a mechanism, the construction of which is of simple and substantial character, and which is readily adaptable to locomotive trucks of the present standard types, both leading trucks and trailing trucks, which latter class follows the driving wheels when going ahead, and becomes a leading truck when backing.

In the practice of my invention, referring descriptively to the specific embodiment thereof in a two wheeled leading truck which is herein exemplified, the truck frame, 1, in which an axle carrying the truck wheels, 2, is mounted, is coupled to the main frame, 3, of the locomotive by a rearwardly extending radius bar, 4, of substantially V form, the converging arms of which are bolted, at their front ends, to the truck frame, and the rear end of which is forked and pivotally connected to a cross tie, 3ª, on the main frame, by a fulcrum pin, 5, fixed in a block, 5ª, which is movable transversely to the frame, in a curved slot, 3ᵇ, in the cross tie, 3ª, the radius of curvature of said slot being concentric with the truck spindle, 6, about the axis of which the truck frame is movable.

A double armed adjusting lever, 7, having upper and lower arms extending in opposite directions from a vertical fulcrum journal, 7ª, is pivoted, by said journal, in a bearing, 1ª, on the rear of the truck frame, in the middle vertical plane thereof. The front end of the lever, 7, is forked to engage a two part bearing, 7ᶜ, which is fitted on the truck spindle, 6. The front of the bearing, 7ᶜ, is closed by a thimble, 7ᵈ, secured in position by a bolt, 7ᵉ, a small space being left between the front of the bearing and the thimble. The rear end of the lever, 7, is coupled by a pin, 7ᵇ, to a double armed thrust lever, 8, which normally extends at a right angle to the truck and main frames. The ends of the thrust lever are coupled, by pins, 8ª, to double armed floating levers, 9, which extend rearwardly, and are pivotally connected, by pins, 9ª, to a cross tie, 3ᶜ, on the main frame. The rear ends of the floating lever are coupled, by pins, 9ᵇ, to a transversely extending double armed fulcrum lever, 10, which is pivoted, at its middle, on the fulcrum pin, 5.

In the operation of the mechanism, when the truck is deflected in passing a curve, the fulcrum journal, 7ª, is displaced laterally with the truck, but the truck spindle, 6, remains in the longitudinal central plane of the locomotive. The lever, 7, swiveling on the truck spindle, 6, its fulcrum journal, 7ª, is moved laterally, thereby correspondingly moving the pin, 7ᵇ, in the same direction as the truck. The linkage constituted by the levers, 8, 9, and 10, fulcrumed at the pins, 9ª, causes a reversal of this lateral movement to be transmitted to the pin, 5, which, with its sliding block, 5ª, traverses laterally in the slot, 3ᵇ, of the frame cross tie, 3ª. The resulting fulcrum point, governing the swing of the truck, and consequently the angle of the truck wheel, will therefore be seen to have been established by the truck itself, its swing having directly caused such movement of its fulcruming point as to bring the truck axle radial with the curve of the track, thereby greatly reducing the wear of the flanges and rails. The disposition of the several members of the mechanism is such that in running on tangent track, sufficient rigidity exists to maintain the axle square with the track, and a decided deflection must be imparted to the truck, to cause the radius bar fulcrum pin to move from its normal central position.

I claim as my invention and desire to secure by Letters Patent:

1. The combination, in a locomotive, of a main frame; a two wheeled truck; a radius bar, connecting said truck pivotally to the main frame; and means for governing the fulcruming point of the truck swing by the swing of the truck itself.

2. The combination, in a locomotive, of a main frame; a two wheeled truck; a radius bar, fixed to the frame thereof; a block, fitted to move transversely, relatively to the main frame; a pin, fixed in said block and coupled, pivotally, to the radius bar; and means for governing the position of said pin by the swing of the truck itself.

3. The combination, in a locomotive, of a main frame; a two wheeled truck; a radius bar, connecting said truck pivotally to the main frame; and a system of articulated levers, interposed between the truck spindle and the radius bar pivot, said system deriving motion from the lateral movement of the truck, and acting to reverse and transfer such lateral motion to the pivot of the radius bar.

4. The combination, in a locomotive, of a main frame; a two wheeled truck; a radius bar, fixed to the frame thereof; a double armed adjusting lever, journalled on the truck frame and coupled, pivotally, to the truck spindle; a double armed thrust lever, pivotally connected, at its middle, to the adjusting lever; double armed floating levers, pivoted on the main frame and pivotally connected to the thrust lever; a block, fitted to move transversely relatively to the main frame; a pin, fixed in said block; and coupled, pivotally, to the radius bar; and a double armed fulcrum lever, journalled, at its middle, on said pin, and pivotally connected, at its ends, to the floating levers.

FREDERICK C. HOHENSTEIN.

Witnesses:
C. R. MONROE,
F. T. JEWELL.